Oct. 16, 1956 R. DALLIMONTI 2,766,955
BRACKET FOR MEASURING INSTRUMENT
Filed March 25, 1952 2 Sheets-Sheet 1

INVENTOR.
R. DALLIMONTI
BY Arthur H. Swanson
ATTORNEY.

Oct. 16, 1956  R. DALLIMONTI  2,766,955
BRACKET FOR MEASURING INSTRUMENT
Filed March 25, 1952  2 Sheets-Sheet 2
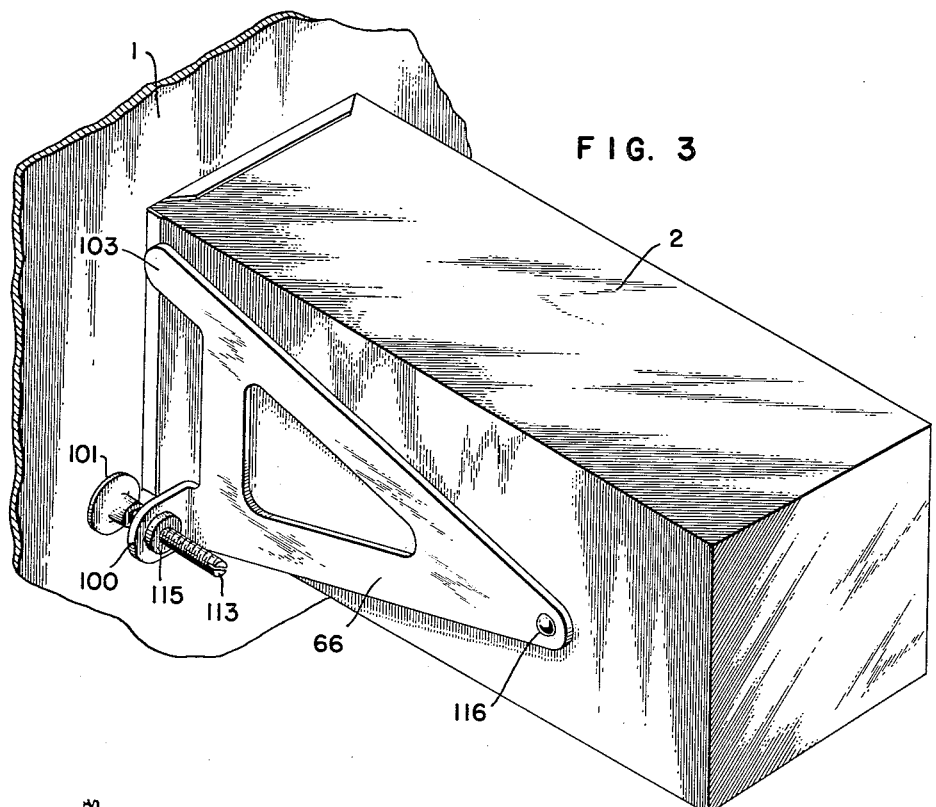
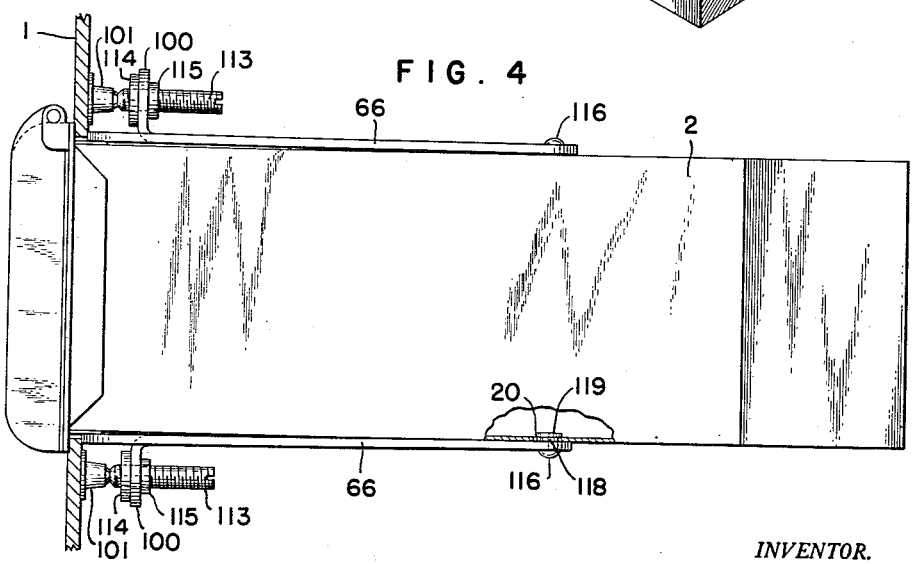
INVENTOR.
R. DALLIMONTI
BY
ATTORNEY.

United States Patent Office 2,766,955
Patented Oct. 16, 1956

2,766,955

BRACKET FOR MEASURING INSTRUMENT

Renzo Dallimonti, Ambler, Pa., assignor to Minneapolis-Honeywell Regulator Company, Minneapolis, Minn., a corporation of Delaware Application March 25, 1952, Serial No. 278,523

1 Claim. (Cl. 248—27)

This invention relates to means for supporting industrial-process-controlling instruments, particularly recorders.

The modern trend in such instruments is toward small devices which can be mounted on the instrument board or panel so as to occupy but a minimum space thereon. In order to accommodate the necessary component parts such a case must project for a considerable distance behind the panel. This means that the center of gravity is far removed from the panel. Therefore, it is necessary to provide an adequate support for the case, particularly since its component parts may be removed for adjustment or repair and then restored.

It is therefore an object of this invention to provide a mounting bracket for a case which encloses a recorder, which mounting bracket supports the case for ready attachment to or removal from its supporting panel or instrument board.

The various features of novelty which characterize this invention are pointed out with particularity in the claim annexed to and forming a part of this specification. For a better understanding of the invention, however, its advantages and specific objects obtained with its use, reference should be had to the accompanying drawings and descriptive matter in which is illustrated and described a preferred embodiment of the invention.

In the drawings:

Fig. 3 is a perspective view of the rear of a modified form of bracket and case supported thereon.

Fig. 4 is a top or plan view of the modification of Fig. 3 with parts broken away in horizontal, longitudinal cross section.

Figure 1:
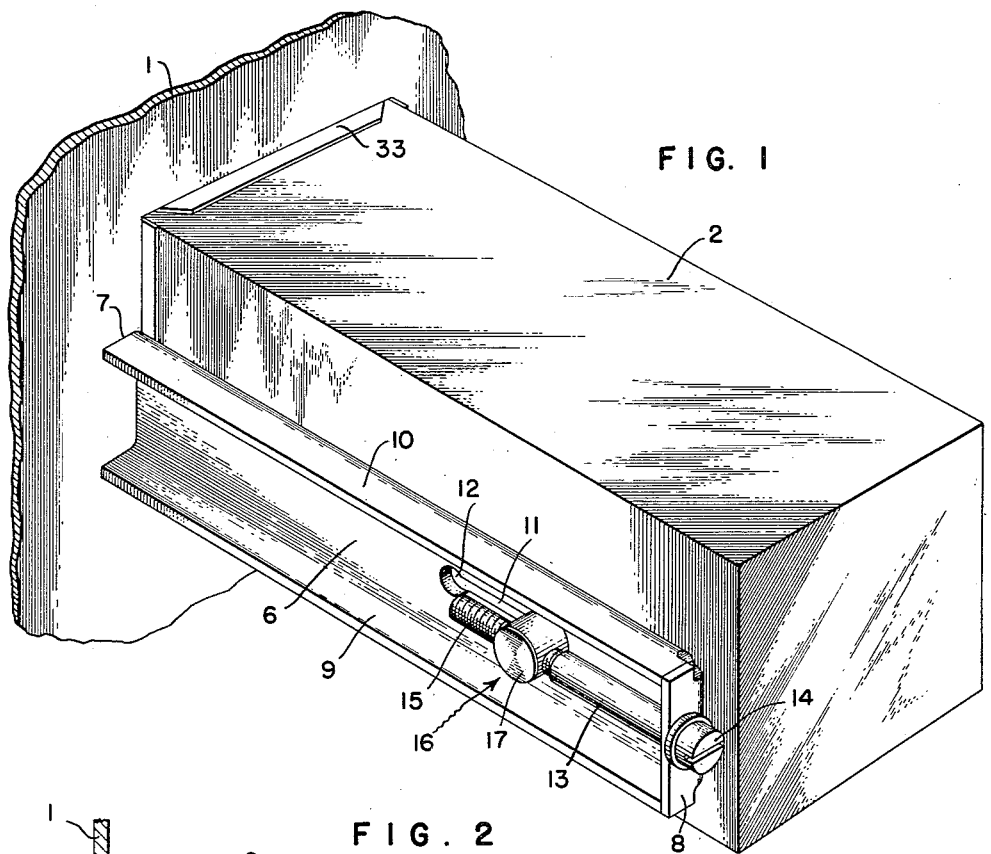
Fig. 1 is a perspective view of the rear of the bracket and case supported thereon.
Figure 2:
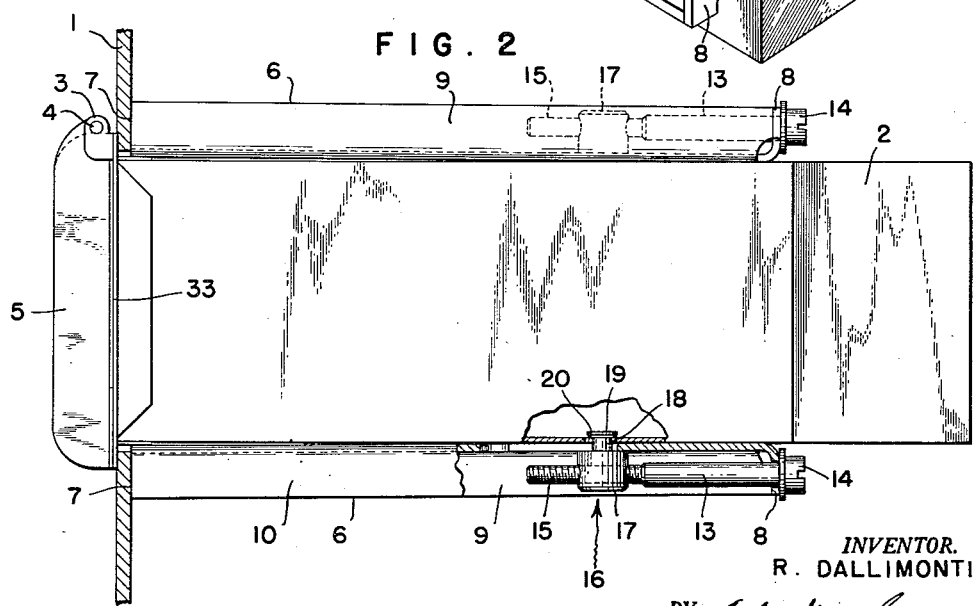
Fig. 2 is a top or plan view with parts broken away in horizontal, longitudinal cross section.

Figs. 1 and 2 show an instrument board or panel 1, which is usually of sheet steel, and which has a perforation through it through which perforation the front end of the instrument casing projects. This casing 2 has five walls, top, bottom, two side and rear end. The case may conveniently be made of hot rolled annealed sheet approximately 0.0478 inch in thickness and enameled in any suitable color such as gray or black. At the front end of the casing 2 flanges 33 project sidewise therefrom. Hinges 3 are mounted on flanges 33 and support pins 4 by means of which a cover 5 is attached to the case and pivots relative thereto. Cover 5 may conveniently be made of transparent plastic. This case contains a motor, a strip chart driven by the motor, a scale, and a pen movable with relation to the scale and the chart so as to mark upon the chart the instantaneous value of the variable being measured. This variable is measured by a suitable measuring element which is suitably connected to the pen to move it across the chart and relative to the scale.

In order to support the casing 2 and the parts contained therein, a suitable bracket is provided. This supporting bracket comprises duplicate parts of which but one will be described. Channel beam 6 is of generally U-shape in transverse, vertical cross section. Channel 6 abuts at its front end 7 upon the panel or instrument board 1. At the opposite or rear end channel 6 has a flange 8 bent up into abutment with the ends of the side flanges 9 and 10. The rear flange 8 has a perforation through it. Channel 6 is conveniently made of cold rolled steel sheet approximately 0.1196 inch in thickness. Through the back or vertical wall of channel 6 is an elongated slot 11 having an enlarged head 12.

Through the hole in the rear flange 8 passes a screw 13 having an enlarged head 14 and a screw threaded portion 15 of reduced cross section.

Screw threadly mounted on portion 15 of screw 13 is a stud 16 having an enlarged body 17 through which passes a generally horizontal hole having screw threads adapted to mate with those of screw threaded portion 15. At its inner end stud 16 has a neck 18 of reduced cross section on the end of which is a head 19 having a frusto conical face. Head 19 is adapted to pass through a hole 20 in the side wall of the case 2. This hole 20 is approximately aligned with the center of gravity of case 2 and the parts carried thereby.

In order to attach the case 2 to the panel or instrument board 1, the case is slid from the front through the opening in panel 1 so that case 2 projects to the rear of panel 1. The heads 19 of studs 16 are passed through the holes 12 in the channels 6 and through the holes 20 in the sides of the case 2, these holes being aligned for this purpose. The screws 13 are then passed through the holes in the rear flanges 8 so that their screw threaded portions 15 enter the holes in the bodies 17 of the studs 16. Screws 13 are then rotated clockwise. Since the heads 14 of the screws 13 abut the rear faces of the rear flanges 8, clockwise rotation of screws 13 draws the studs 16 back along the slots 11 until the necks 19 of the studs 16 engage the rear sides of holes 20 in case 2. Since the rear face of flange 33 engages the front face of panel 1, the case 2 is held against rearward movement and the channels 6 are moved forward until the front ends of the channels 6 engage the rear face of the panel 1. By this means the case 2 is held securely and snugly in position. The case 2 can be removed from panel 1 by loosening the screws 13 and reversing this operation.

Figs. 3 and 4 show a modification in which the panel 1 has a case 2 having holes 20 in its side walls mounted on panel 1 as before. The brackets of this modification, however, are of generally A-shape in side view. The brackets 66 are duplicates so that but one need be described, and have at their apex or inner end a stud 116 having a neck 118 and inner head 119 adapted to project through and fasten into holes 20 in the case 22. The lower leg of the bracket 66 is bent over at angles to the case 2 to form a preforated flange 100 in which is mounted a screw 113 having screw threads on it which mate with a pair of lock nuts 114 and 115. Between the forward or left of end screw 113 and a foot 101 is a spherical portion (not shown) on which forms a limited, universal mounting. Foot 101 is adapted to be stressed against the rear of the panel 1.

In applying the case 2 to the panel 1, the case 2 is slid into the opening in the panel 1 so that it projects to the rear thereof. The heads 119 are slid through the holes 20 in case 2. The screws 113 are then tightened so as to force the foot 101 against the rear of the panel 1. This lifts the studs 116 against the sides of the hole 20 in the case 2 and at the same time presses the ends of the upper legs 103 of the bracket 66 against the rear of the panel 1.

While, in accordance with the provisions of the statutes, I have illustrated and described the best form of the invention now known to me, it will be apparent to those skilled in the art that changes may be made in the form of the apparatus disclosed without departing from the spirit of the invention as set forth in the appended claim, and that in some cases certain features of the invention may sometimes be used to advantage without a corresponding use of other features.

Having now described my invention, what I claim as new and desire to secure by Letters Patent is as follows:

A bracket adapted to support a casing having a flange projecting at a right angle thereto by lying adjacent the side wall thereof and to project rearwardly from the rear of a support through an opening in the support, said bracket including a substantially A-shaped member of flat metal sheet, a stud projecting at a right angle to said bracket from the apex of the A adjacent the rear thereof and adapted to pass through a hole in the side wall of said casing and to engage at its sides with the side of the hole in said casing, a flange extending from said bracket at a right angle thereto from one leg of the A and having an opening therethrough, a rounded edge on said bracket at the end of the other leg of the A spaced from said flange, a screw located in the opening in said flange and conveniently adapted for rotation from the rear of said casing, and a foot mounted on the forward end of said screw with a limited universal mounting, so that, when said screw is rotated, the front face of said foot engages the rear face of said support and draws said casing toward the rear of said support so that the rear of said flange on said body engages the front of said support and the rounded portion of said bracket pivots about said stud into engagement to the rear of said support.

References Cited in the file of this patent
UNITED STATES PATENTS

| | | |
|---|---|---|
| 2,440,324 | Blakeslee | Apr. 27, 1948 |
| 2,442,357 | Hamman | June 1, 1948 |
| 2,562,260 | Caldwell | July 31, 1951 |